(12) United States Patent
Sun et al.

(10) Patent No.: US 9,876,356 B2
(45) Date of Patent: Jan. 23, 2018

(54) DYNAMIC AND ADAPTIVE CONFIGURABLE POWER DISTRIBUTION SYSTEM

(71) Applicant: Mitsubishi Electric Research Laboratories, Inc., Cambridge, MA (US)

(72) Inventors: Hongbo Sun, Plymouth, MA (US); Yishen Wang, Seattle, WA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 659 days.

(21) Appl. No.: 14/504,535

(22) Filed: Oct. 2, 2014

(65) Prior Publication Data

US 2016/0099567 A1    Apr. 7, 2016

(51) Int. Cl.
*H02J 3/14*  (2006.01)
*H02J 3/00*  (2006.01)
(Continued)

(52) U.S. Cl.
CPC .............. *H02J 3/14* (2013.01); *H02J 3/005* (2013.01); *H02J 3/24* (2013.01); *H02J 13/0006* (2013.01); *H02J 3/28* (2013.01); *H02J 3/381* (2013.01); *H02J 3/382* (2013.01); *H02J 2003/001* (2013.01); *H02J 2003/007* (2013.01); *H02J 2003/143* (2013.01); *Y02B 70/3225* (2013.01);
(Continued)

(58) Field of Classification Search
None
See application file for complete search history.

(56) References Cited

U.S. PATENT DOCUMENTS 6,370,483 B1 * 4/2002 Beckwith ........... G01R 19/2513
361/35
8,805,598 B2    8/2014 Shaffer et al.
(Continued)

OTHER PUBLICATIONS

Xing et al., "Improved Moment Method for Network Reconfiguration with Time-Varying Load in Distribution Systems", Nov. 2004, IEEE, pp. 139-144.*
(Continued)

*Primary Examiner* — Qing Wu
(74) *Attorney, Agent, or Firm* — Gene Vinokur; James McAleenan; Hironori Tsukamoto (57) ABSTRACT

A power distribution system is dynamically and adaptively configured in real-time to improve energy efficiency, reliability and power quality, particularly if the system includes renewable sources and storages. An optimal multi-objective scheduling and partitioning method is provided to partition the system into self-sufficient sections (SSS) through optimally combination of adjacent basic switching sections (BSS). The SSSs enable system operating at a lower cost, with less power losses, more energy efficiency, improved power quality, and sufficient transient security. The method uses two storage based transient security indices, storage compensation power margin (SCPM) and storage compensation energy margin (SCEM) evaluate the transient stability margin of distribution system. A minimal stability margin is used to ensure that the system remains stable when subject to large unexpected load deviations.

20 Claims, 8 Drawing Sheets

(51) Int. Cl.
- *H02J 3/24* (2006.01)
- *H02J 13/00* (2006.01)
- *H02J 3/28* (2006.01)
- *H02J 3/38* (2006.01)

(52) U.S. Cl.
CPC ......... *Y02B 70/3266* (2013.01); *Y02B 90/222* (2013.01); *Y02E 40/72* (2013.01); *Y02E 60/728* (2013.01); *Y02E 60/74* (2013.01); *Y04S 10/10* (2013.01); *Y04S 10/123* (2013.01); *Y04S 10/265* (2013.01); *Y04S 10/30* (2013.01); *Y04S 20/10* (2013.01); *Y04S 20/12* (2013.01); *Y04S 20/222* (2013.01); *Y04S 20/242* (2013.01)

(56) References Cited

U.S. PATENT DOCUMENTS

| | | |
|---|---|---|
| 2007/0086123 A1 | 4/2007 | Ravera et al. |
| 2012/0065804 A1 | 3/2012 | Biswal et al. |
| 2013/0015703 A1* | 1/2013 | Rouse ................ H02J 3/38 307/18 |
| 2013/0069447 A1* | 3/2013 | Sato .................... H02J 13/0006 307/126 |
| 2013/0257153 A1 | 10/2013 | Krenz et al. |
| 2014/0232186 A1* | 8/2014 | Jang ......................... H02J 4/00 307/11 |

OTHER PUBLICATIONS

Carreno et al., "An Efficient Codification to Solve Distribution Network Reconfiguration for Loss Reduction Problem", Nov. 2008, IEEE, pp. 1542-1551.*

Baran et al., "Network Reconfiguration in Distribution Systems for Loss Reduction and Load Balancing", Apr. 1989, IEEE, pp. 1401-1407.*

Amanulla et al., "Reconfiguration of Power Distribution Systems Considering Reliability and Power Loss", Apr. 2012, IEEE, pp. 918-926.*

Shapovalov et al., "Forecast-based Network Reconfiguration Algorithm", Aug. 2014, 18$^{th}$ Power Systems Computation Conference.*

\* cited by examiner

DYNAMIC AND ADAPTIVE CONFIGURABLE POWER DISTRIBUTION SYSTEM

FIELD OF THE INVENTION

The present invention relates generally to electric power systems, and more particularly to a dynamic and adaptive configurable power distribution system.

BACKGROUND OF THE INVENTION

Figure 1:
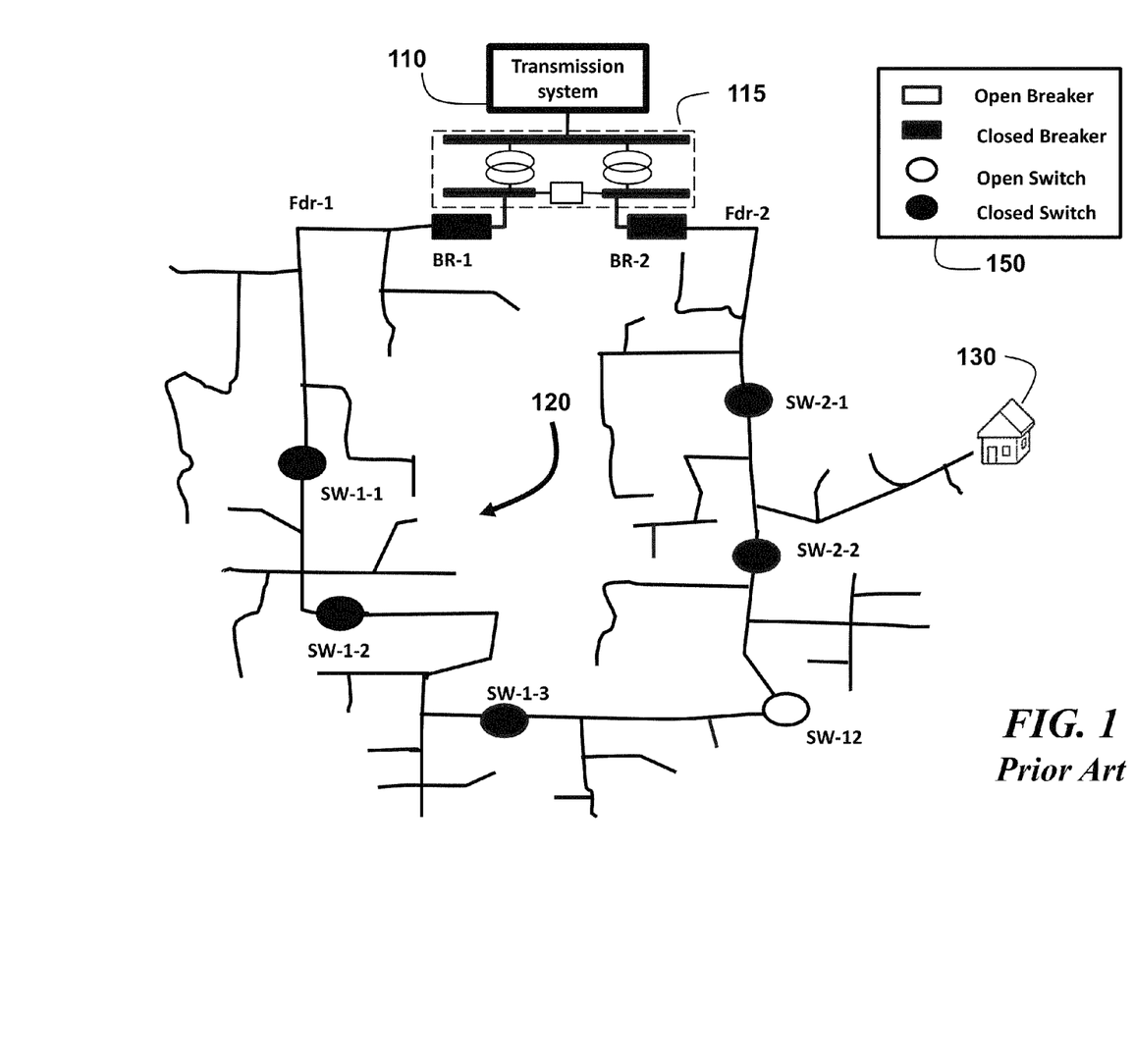
FIG. 1 is a schematic of conventional power distribution system.

As shown in FIG. 1 for a conventional electric power system, power is fed from a transmission system 110 to consumers 130, via a substation 115 and a distribution system 120 (electric utility). Because conventional distribution systems have no or very limited generation resources, any outage at or upstream from a substation affects the entire distribution systems. The outages can be due to generator and transmission line failures, short-circuit, overloads, climate and severe weather conditions, and geological events. Usually, a topology of the distribution system is radial and unidirectional, with currents flowing from the substation through the breakers and switches to the consumers.

Each downstream feeder can have a circuit breaker at a feeder head, several normally closed switches, i.e., sectionalizing switches, along the feeder, and several normally open switches, i.e., tie switches, at intersections between adjacent feeders, see legend 150. One purpose of the breakers and switches is to isolate the outages from functional parts of the system.

The example distribution system includes two feeders Fdr-1, and Fdr-2. The feeder Fdr-1 has one breaker BR-1, and three sectionalizers SW-1-1, SW-1-2, SW-1-3. The feeder Fdr-2 has one breaker BR-2, and two sectionalizers SW-2-1, SW-2-2. There is a tie switch SW-12 between the Fdr-1 and Fdr-2.

Modern electric power systems can include generators powered by solar, wind, landfill gas, and diesel fueled generators, even in distribution systems. Small generators, such as natural gas fueled micro-turbines can be co-located with consumers. This alternative distributed generation (DG) can enable local energy self-sufficiency, e.g., during outages, provided the distribution system is properly designed to integrate the DG, such as enabling of bi-directional power flows.

In addition, "green" consumers are more energy aware, and may want to adjust their energy consumption dynamically, particularly in a smart grid. Therefore, in a modern electric power system, demand responsive resources (DRR) are increasingly common. DRR change power consumption patterns that potentially could affect how the distribution system is configured.

This opens up new issues for the operation and control of the distribution systems. The first issue is that many of the renewable power sources are weather and time dependent. Therefore, the distribution system needs to be flexible to best facilitate intermittent and time-dependent renewable power source. In addition, the operation of the distribution systems needs to be able to accommodate bidirectional power flows.

The second issue is that some renewable resource, such as solar panels, output DC current. Therefore, distribution system needs DC to AC inverters to integrate those generation resources into the system. However, inverter based generation sources have no or less inertia than conventional synchronous generators. Thus, the distribution system has less time to react to and avoid instability when a local outage occurs, e.g., a sudden lack of wind or sunshine Therefore, the beakers and switches must be operate at much higher switching rate to reduce the system reaction time, and capacities of power storages must be properly used to increase the inertia of the system.

Several methods are known for configuring distribution systems to achieve a specific objective. US 20070086123 describes configuring a power distribution network only upon detection of a short-circuit or overload. U.S. Pat. No. 8,805,598 describes a dynamic reconfiguration of distribution feeder circuit based on overload protection parameters. US 20120065804 describes real-time feeder configuration for load balancing in distribution system automation due to overload at transformers. US 20130257153 describes a method for switching power to one or more loads based on overload, efficiency and availability of power sources. Characteristically, the above prior art methods generally reconfigure the distribution system only in response to unanticipated events.

The prior art systems and methods generally configure distribution systems for specific situations or applications, such as faults, and load balancing. Those solutions do not provide adequate solutions for distribution systems with a large number of renewable DG and more energy aware consumers using DRR.

Therefore, there is a need for a distribution system that can be configured dynamically to increase reliability, and efficiency of power distribution among consumers.

SUMMARY OF THE INVENTION

The embodiments of the invention provide a system and method that can dynamically and adaptably configure a power distribution system in response to real-time changes in generation resources, load demands, system reliability and stability.

The distribution system can use a radial topology and fast high-power switches (super-switches) instead of the relatively slow breakers, and conventional sectionalizing and tie-switches. However, it is understood that other topologies are also possible, including topologies wherein the flow of current is bidirectional.

The super-switches enable rapid opening and closing actions with a high rate duty cycle. The switches can be solid state switches, instead of the conventional electromechanical switches, to switch with loading and fault currents. For examples, the super-switches can switch at a rate about three orders of magnitude faster than convention electromechanical switches.

Because the switching time is much faster than the conventional switches, the switches provide the capability to handle systems with a relatively low inertia. Advanced measurement units, e.g., a phasor measurement unit (PMU) or synchrophasor, equipped to a super-switch enables real-time monitoring and control of the configuration of distribution system.

The underlying idea for the invention is to optimally configure the distribution system dynamically and adaptively based on past, current, anticipated and unanticipated system conditions or states.

The distribution system can be partitioned and configured as a set of basic switching sections (BSS) using the super-switches (SS). The BSS is a minimal section that the distribution system serves or isolates. Adjacent BSSs can be combined into a self-sufficient sections (SSS) that operates independently for each other.

The embodiments use an optimal configuration schedule. When to configure the distribution system is based on real-time measuring, periodically evaluation of the real-time performance indices, or in response to events, anticipated or unanticipated. The real-time monitoring determines past, current and future operational performance indices during every predetermined evaluation interval, or when an exceptional event occurs. Then, a system configuration signal is generated to determine whether there is a possible stable configuration with better performances.

The embodiments determine optimal SSS combinations for operation during the next predetermined operation-cycle, e.g., half hours, until the next configuration signal generated. A configuration is achieved, in part, by opening and closing the super-switches. The goal is to obtain a power balanced result with reduced line losses, less voltage deviations, and relieved current loadings with limited switching operations.

The embodiments for the configuring use two transient security indices, storage compensation power margin (SCPM), and storage compensation energy margin (SCEM) for a low inertia distribution system equipped with energy storage systems (ESS) and distributed generations (DGs).

The SCPM and SCEM describe the transient security for a particular configuration of the distribution system. With adequate SCPM and SCEM, the system can tolerate most unexpected load deviations and errors in forecasting renewable resources. The margins are a good measure of stability level of the distribution system without time domain analysis, so the method can be implemented in real-time. Extra conservativeness introduced by the SCEM and SCPM increases the stability guarantee.

DETAILED DESCRIPTION OF THE PREFERRED EMBODIMENTS

Distribution System Configuration

Figure 2:
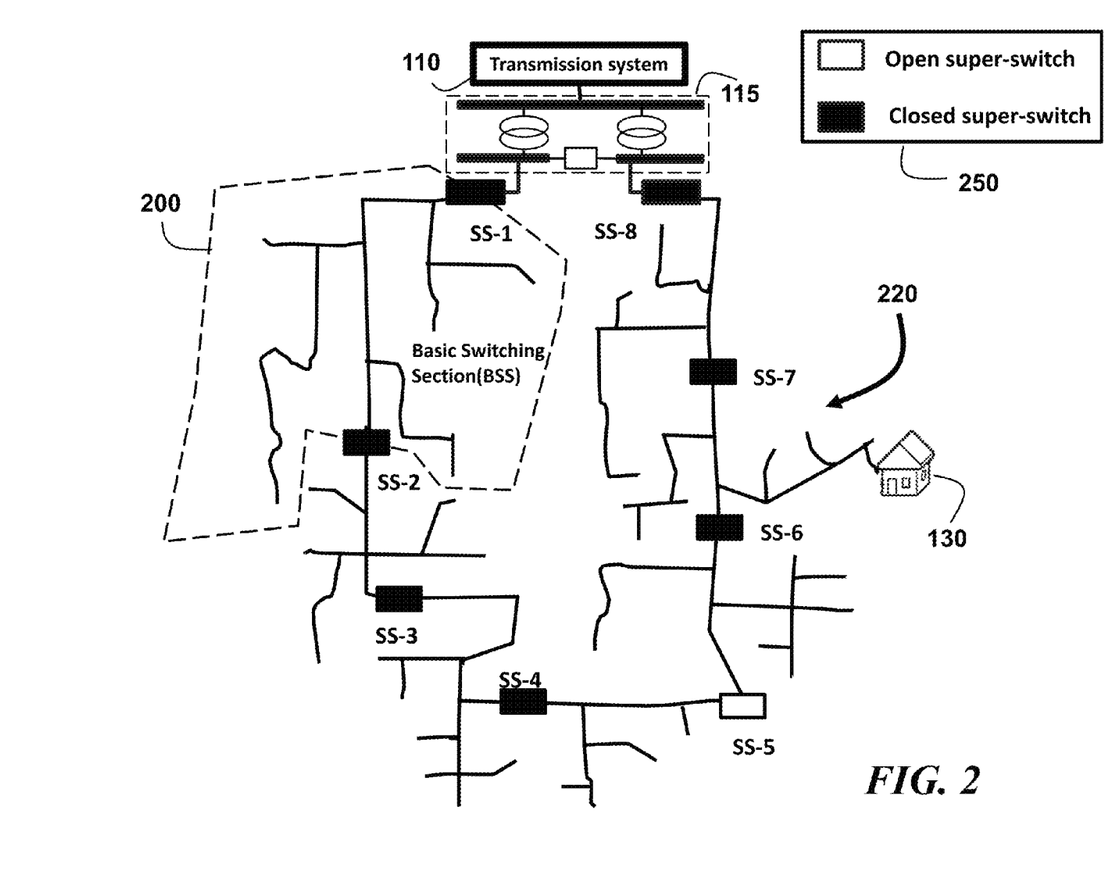
FIG. 2 is a schematic of basic switching section (BSS) in a power distribution system according to embodiments of the invention.

As shown in FIG. 2, a power distribution system 220 according to embodiments of the invention can use a radial topology with a tree structure. Other topologies, such mesh, looped, and tied ring are also possible.

In the system, conventional sectionalizing and tie switches are replaced with, e.g., solid state super-switches 250. In FIG. 2, there are eight super-switches. The switches SS-1 and SS-8 are connected to the transmission system (main grid) 110. These switches can open and close at a relatively high frequently when compared with conventional electromechanical switches. The switches can be equipped with phasor measurement units (PMU) or synchrophasors to enable real-time monitoring and control. The PMU can supply voltages and currents measurements at high sampling rate, for examples, 60 samples per second.

Basic Switching Sections

Using the super-switches the distribution system can be configured with basic switching sections (BSS) 200. The BSS is a minimal section that can be served or isolated by a distribution system operator (DSO).

Self-Sufficient Sections

Figure 3:
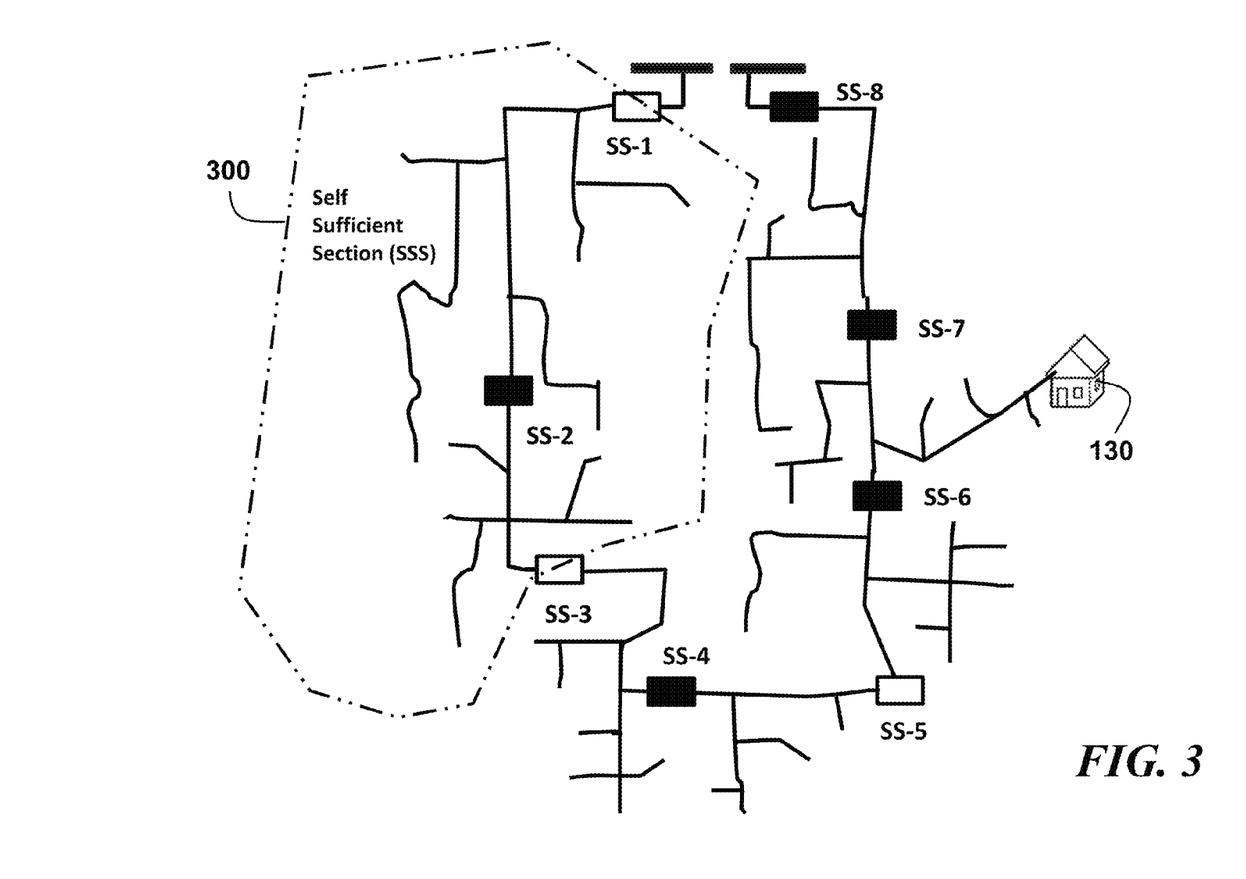
FIG. 3 is a schematic of self-sufficient section (SSS) in the power distribution system according to embodiments of the invention.

As shown in FIG. 3, adjacent BSSs can be combined into a self-sufficient section (SSS) 300 that operates independently for each other according to operating conditions. Each SSS has sufficient generation and storage reserve to maintain a stable frequency and voltage with appropriate stability margins. The SSS in FIG. 3 is formed by opening the super-switches SS-1 and SS-3, and closing the super-switch SS-2.

The distribution system is configured in response to loading and sourcing changes, and emergencies, such as fault and instability. The configurations can be based on monitoring and analyzing system states according to the real-time measurements by the PMU at the switches.

Daytime Configuration

Figure 4:
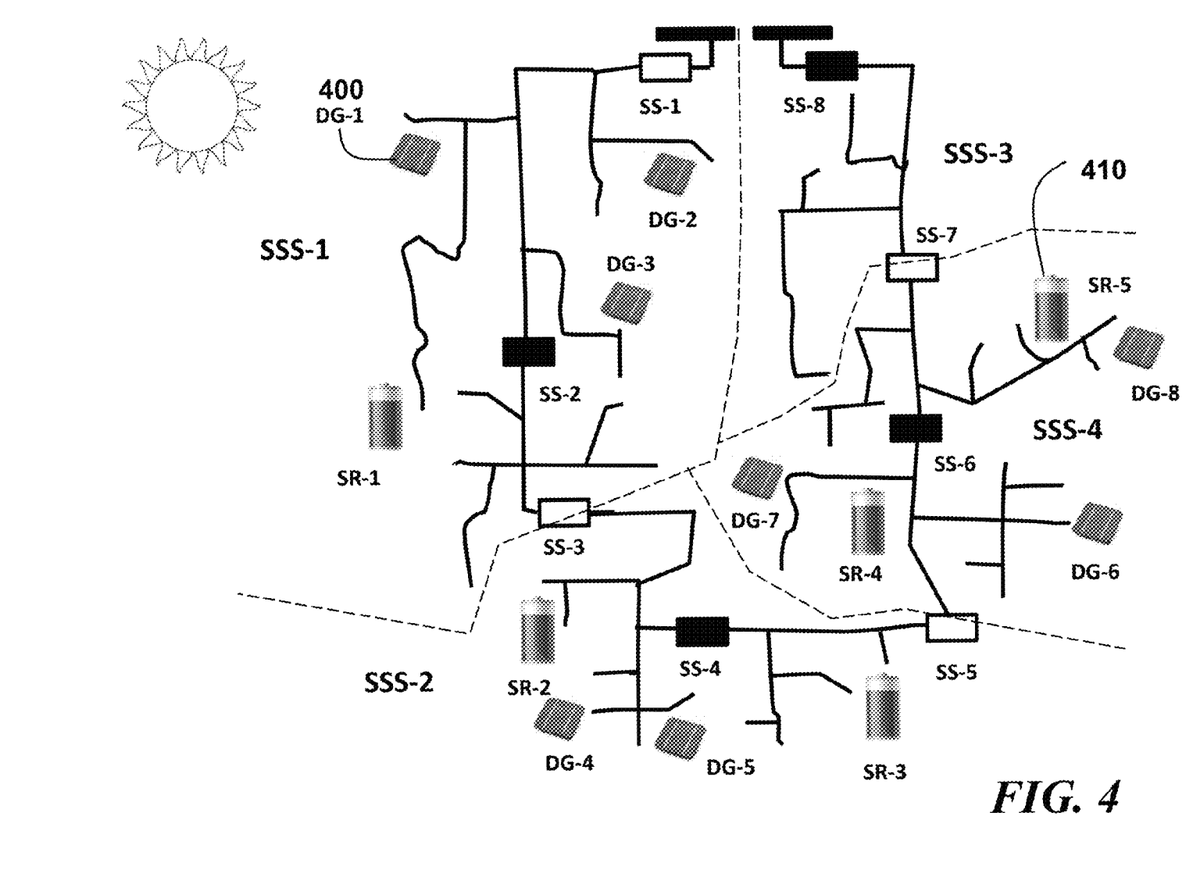
FIG. 4 is an example of operating the power distribution system during a daytime period according to embodiments of the invention.

FIG. 4 shows a daytime configuration of the example distribution system with four independently-operated self-sufficient sections SSS-1, SSS-2, SSS-3, and SSS-4. This configuration fully utilizes renewable resources, such as solar panels 400. The section SSS-1 has enough generations from its local resources, such as DG-1, DG-2, DG-3, so it is disconnected from the main grid and other SSSs by opened switches SS-1 and SS-3. The section SSS-3 is connected with the main grid due to lack of local resources. The sections SSS-2 and SSS-4 also solely use local resources, and power storage units 410, e.g., batteries, can be set at charging states to fully utilize the renewable resources.

Nighttime Configuration

Figure 5:
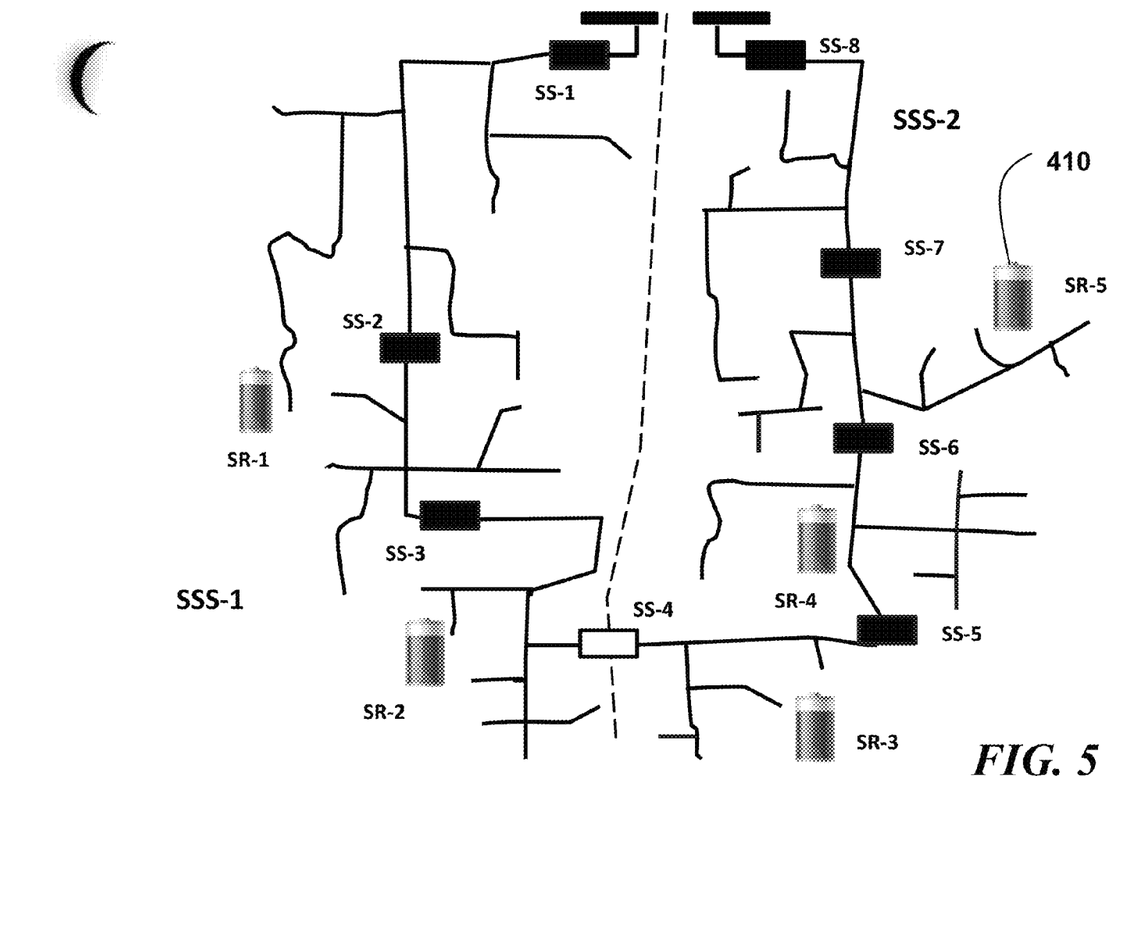
FIG. 5 is an example of operating the power distribution system during a nighttime period according to embodiments of the invention.

FIG. 5 shows a nighttime configuration for the same distribution system as in FIG. 4. This configuration has two independent-operation sections, SSS-1 and SSS-2. Both sections are connected with the main grid. The storage units 410 can also be used by setting at discharging states.

Configuration Scheduling for Operation

As an independent operated section, each SSS has adequate distributed generation capabilities to ensure a load generation balance. In addition, to reduce the maintenance cost and keep the system reliable, the super-switches should not operate too frequently, which means the load generation balance within each SSS should be consistent over a relatively longer period of time called an operation cycle, see below. The operation-cycle can be based on distribution system requirements. The topology should be valid for an entire operation cycle as long as there are no exceptional events that exceed certain constraints of an objective function. The monitoring of the distribution system can be on a real-time basis.

Timing Diagram

Figure 6A:
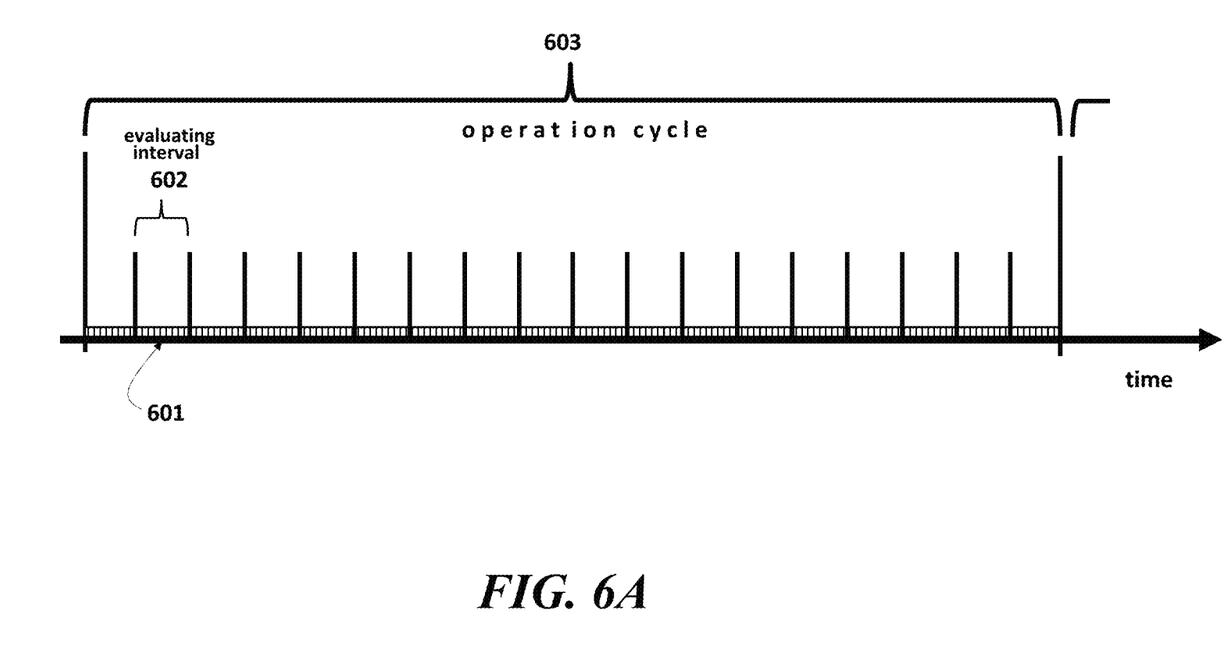
FIG. 6A is a timing diagram for configuration scheduling according to embodiments of the invention.

FIG. 6A shows a timing diagram (not to scale) of the basic idea that underlies the dynamic and adaptive configuring of the distribution system according to embodiments of the invention. The timing operates at three levels. At a finest level, a state of the distribution system is measured essentially in real-time 601, e.g., seconds or less. The measurements are evaluated periodically, e.g., using an evaluating interval 602 of, for example, every couple of minutes, using power flow and stability analysis. Ideally, the configuration should satisfy security, stability, reliability and efficiency requirements during all evaluating intervals. An operation cycle 603 is substantially longer than the evaluating interval, e.g., 30 to 180 minutes or about an order of magnitude longer than the evaluating cycle. The length of the operation cycle can be predetermined or set by the distribution system operator when and as needed. The goal of the longer operation cycle is to keep the configuration of the distribution system relatively stable unless constraints on an objective function that evaluates the performance of the system are violated. If the configuration is changed, then a new operation cycle starts. This approach has the benefits of real-time monitoring while minimizing the switching frequency.

The generators and storages should have adequate ramp up and ramp down capabilities to handle load variation and forecast inaccuracies between the evaluating intervals within the operation cycle. Such a look-ahead capability enables to have reliable and smooth scheduling transitions.

Figure 6B:
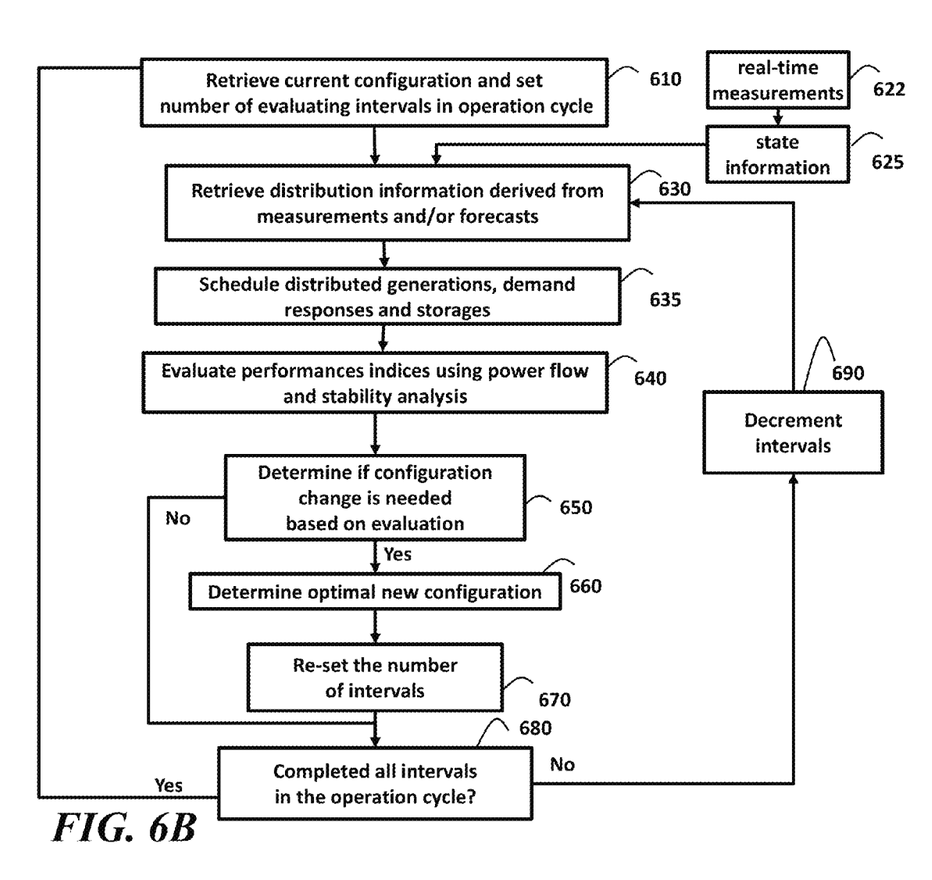
FIG. 6B is a flowchart of periodic evaluations for changing configurations of the distribution system according to embodiments of the invention.

FIG. 6B shows a flowchart of periodic evaluations for configuration changes of the distribution network according to embodiment of the invention using the evaluating interval.

In step 610, retrieve the current configuration, e.g., super-switch statuses and SSS, and set the number of evaluating intervals in the operation cycle.

In step 630, retrieve collected distribution system state information 625 for the current interval, such as load demands, resource availability and outputs, and storage states that are derived from the real-time measurements 622 obtained from, e.g., measuring units at the super-switches. Forecasts can also be considered. The measuring can be continuously performed as a back ground task.

In step 635, determine generation and consumption schedules for distribution generations, demand responsive resources, and storages for each evaluating interval of the operation cycle;

In step 640, evaluate performances indices using power flow and stability analysis for the current configuration.

In step 650, determine whether a configuration change is needed based on the evaluation. If yes, go to step 660, otherwise if no, go to step 680.

Figure 7:
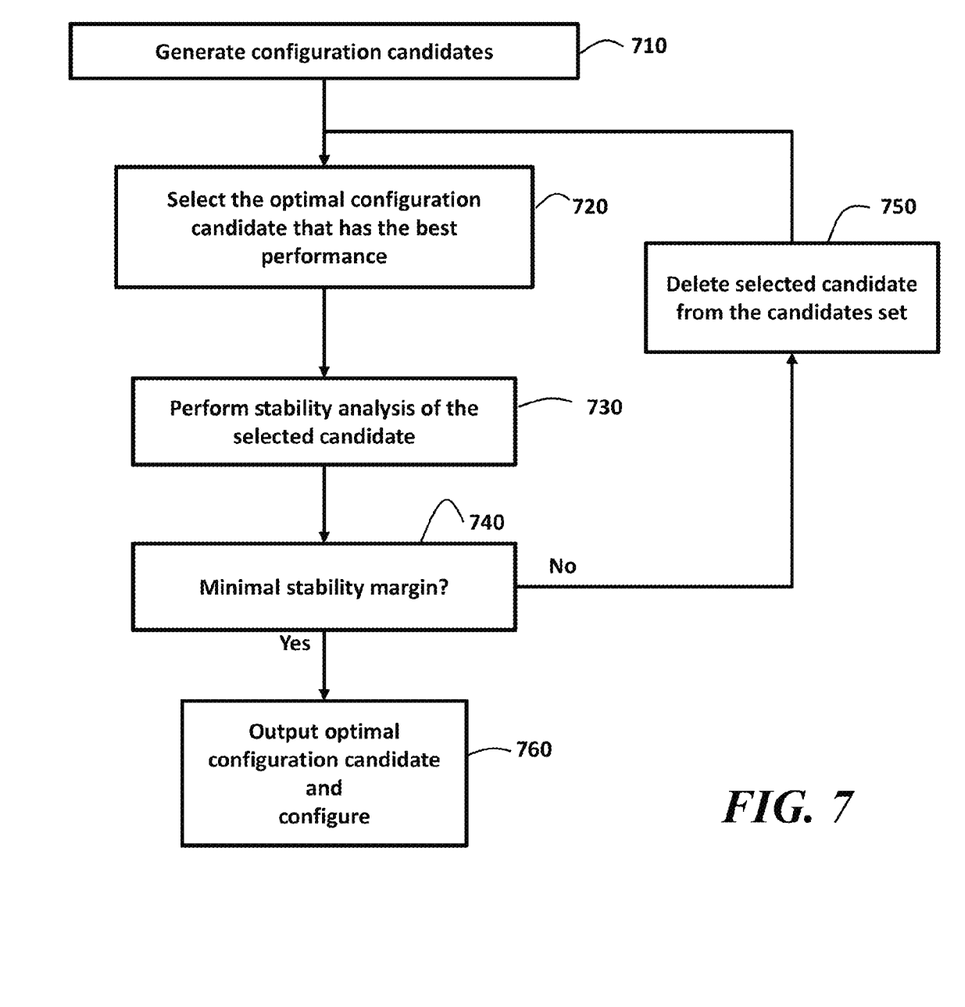
FIG. 7 is the flowchart of optimal configuration scheduling for the distribution system according to embodiments of the invention.

In step 660, determine the optimal new configuration using the steps as described for FIG. 7.

The steps 630, 635, 640, 650 and 660 are performed periodically based on the evaluating interval 602.

In step 670, reset the number of intervals.

In step 680, check whether all intervals within the operation cycle have been evaluated. If yes, go to step 610, and otherwise if no, go to step 690 to decrement the number of intervals.

The power flow is used to determine whether the current BSS combinations are steady-state feasible to configure as a SSS. Transient stability analysis, such as determination of SCPM and SCEM are used to determine whether each SSS has sufficient stability margins to withstand unanticipated events without losing stability.

Constraints

A candidate feasible configuration should satisfy a set of constraints derived from the steady-state security, reliability, power quality, technical limitations for devices (such as storages) and transient or dynamic-state stability.

For each phase of any bus within an energized basic switching section, the phase voltage should be within normal lower and upper thresholds defined by technical and regulation requirements for each interval of the operation cycle. Temporary voltage violations are allowed, but minimized by a penalty in the associated objective functions. The bus voltage constraints are $$x^b(\underline{V}_{i,m} - \Delta \underline{V}^t_{i,m}) \leq V_{i,m}^t \leq x^b(\overline{V}_{i,m} + \Delta \overline{V}_{i,m}^t),$$

$$b \in SBSS, i \in SBUS^b, m \in PH_i, t \in T, \quad (1)$$

wherein SBSS is the set of basic switching sections (BSSs) in the distribution system, $SBUS^b$ is the set of buses in the basic switching section b, $PH_i$ is the set of available phases at bus i, T is the set of evaluating intervals within the operation cycle. $x^b$ is the binary indicator of energized status of basic switching section b, 0 indicates a de-energized status, and 1 indicates an energized status. $x^b$ is set based on system conditions. It is set to be zero if there is a short-circuit fault occurring in the section, or the section needs to be cut off due to lack of generation or stability capacities in the system, and all devices are set as de-energized if $x^b$ sets as zero. $\overline{V}_{i,m}$ and $\underline{V}_{i,m}$ are the normal upper and lower thresholds for voltages allowed at bus i on phase m, $V_{i,m}^t$ is the voltage at the bus i on phase m at evaluating interval t. $\Delta \overline{V}_{i,m}^t$ and $\Delta \underline{V}^t_{i,m}$ are the voltage violations over the normal upper and lower voltage thresholds at the bus i on phase m at evaluating interval t, and $\Delta \overline{V}_{i,m}^t \geq 0$, and $\Delta \underline{V}^t_{i,m} \geq 0$.

For each phase of any two-terminal device, i.e., branch, within an energized basic switching section, such as a line segment, a two-winding transformer, the power flows on the branch from two different directions should be within normal maximal power limits determined by thermal and stability requirements. Any device with more than two terminals, such as a three-winding transformer is converted into multiple two-terminal devices to be modeled. For a single-terminal device, such as a shunt capacitor, it can be treated as a two-terminal device but the voltages of one of its terminals are set to be zero. The temporary overloads are allowed, but minimized by a penalty in the associated objective function. The branch power flows are constrained by $$|S_{ij,m}^t| \leq x^b(\overline{S}_{ij,m} + \Delta \overline{S}_{ij,m}^t),$$

$$|S_{ji,m}^t| \leq x^b(\overline{S}_{ij,m} + \Delta \overline{S}_{ij,m}^t), \text{ and}$$

$$b \in SBSS, ij \in SDEV^b, m \in PH_{ij}, t \in T, \quad (2)$$

wherein $SDEV^b$ is the set of devices in the basic switching section b, $PH_{ij}$ is the set of available phases for the device between bus i and bus j. $\overline{S}_{ij,m}$ is the upper limit of apparent power flowing on the device connected between bus i and bus j on phase m. $S_{ij,m}^t$ and $S_{ji,m}^t$ are the complex powers flowing on the device from bus i towards bus j, and from bus j towards bus i at evaluating interval t respectively. $\Delta \overline{S}_{ij,m}^t$ is the overload at the device on phase m at evaluating interval t, and $\Delta \overline{S}_{ij,m}^t \geq 0$. For a two-terminal device with impedances, the power flows on the device are determined according to the phase voltages at two terminal buses, and the branch admittance matrix for the device is $$S_{ij,m}^t = V_{i,m} e^{j\theta_{i,m}} [\Sigma_{n \in PH_{ij}} (Y_{i,m-i,n}^{AC-ij} V_{i,n} e^{j\theta_{i,n}} + Y_{i,m-j,n}^{AC-ij} V_{j,n} e^{j\theta_{j,n}})^*], \text{ and}$$

$$S_{ji,m}^t = V_{j,m} e^{j\theta_{j,m}} [\Sigma_{n \in PH_{ij}} (Y_{j,m-i,n}^{AC-ij} V_{i,n} e^{j\theta_{i,n}} + Y_{j,m-j,n}^{AC-ij} V_{j,n} e^{j\theta_{j,n}})^*],$$

$$b \in SBSS, ij \in SDEV^b, m \in PH_{ij}, t \in T, \quad (3)$$

wherein $V_{j,m}$ and $\theta_{j,m}$ are the voltage and phase angle of bus j on phase m. $V_{i,n}$, and $\theta_{i,n}$ are the voltage and phase angle of bus i on phase n. $Y_{i,m-i,n}^{AC-ij}$, $Y_{i,m-i,n}^{AC-ij}$, $Y_{j,m-i,n}^{AC-ij}$ and $Y_{j,m-j,n}^{AC-ij}$ are the elements of branch admittance matrix for the device, $Y^{AC-ij}$ at the row and column given by the subscript letters, in which the first twos give the corresponding bus and phase of the row, and last twos give the corresponding bus and phase of the column. The branch admittance matrix $Y^{AC-ij}$ is used to define the relationship between the injected currents and voltages at each phase of terminals buses on the branch. It is a square matrix, and the size of its rows equals to twice the total number of available phases of the branch. The formulation of branch admittance matrix can be different for different types of devices. For examples, for a line segment, the branch admittance matrix is defined by its series impedances and its shunt admittances. For a transformer, the admittance matrix is defined by the winding connections, tap positions, and impedances.

For each super switch connected between bus i and bus j, its power flows at evaluating interval t are constrained by $$|S_{ij,m}^t| = |S_{ji,m}^t| \le x_{ij} \overline{S}_{ij,m}, ij \in SSW, m \in PH_{ij}, t \in T, \quad (4)$$

where SSW is the set of super switches in the system, $x_{ij}$ is the on/off status for the super switch between bus i and bus j for the whole operation cycle, and where 1 denotes on and 0 denotes off.

For any bus within an energized basic switching section, there are power generation and demand balance requirements for each phase at any interval:

$$S_{S_{i,m}}^t + \sum_{j \in SGEN_i} S_{G_{j,m}}^t + \sum_{j \in SSTOR_i} \eta_{DCH_{j,m}} R_{DCH_{j,m}}^t = \sum_{ij \in SDEV_i} S_{ij,m}^t + \quad (5)$$

$$\sum_{j \in SLOAD_i} \left( x^b S_{D_{j,m}}^t - S_{R_{j,m}}^t - S_{C_{j,m}}^t \right) + \sum_{j \in SSTOR_i} \frac{R_{CH_{i,m}}^t}{\eta_{CH_{i,m}}}$$

$$b \in SBSS, i \in SBUS^b, m \in PH_i, t \in T,$$

wherein $SGEN_i$, $SSTOR_i$ and $SLOAD_i$ are the sets of distributed generators, storages and loads connected to bus i. $SDEV_i$ is the set of devices that connected with bus i. $S_{S_{i,m}}^t$ is the complex power imported from transmission system through substation connected with bus i on phase m at evaluating interval t. $S_{G_{j,m}}^t$ is the complex power generated by distributed generator j on phase m at evaluating interval t. $S_{D_{j,m}}^t$, $S_{R_{j,m}}^t$, and $S_{C_{j,m}}^t$ are the complex power demands, tolerable power reductions, and forced power curtailments of load j on phase m at evaluating interval t. $R_{DCH_{j,m}}^t$ and $\eta_{DCH_{j,m}}^t$ are the discharging rate and efficiency of storages j on phase m at evaluating interval t. $R_{CH_{j,m}}^t$ and $\eta_{CH_{j,m}}^t$ are the charging rate and efficiency of storages j on phase m at evaluating interval t.

The total imported powers from the transmission system for all three phases are limited by the system capacities or purchase agreements:

$$x_{is}^t \underline{S}_{S_i}^t \le \Sigma_{m \in PH_i^b} S_{S_{i,m}}^t \le x_{is}^t \overline{S}_{S_i}^t, \quad (6)$$

where $\overline{S}_{S_i}^t$ and $\underline{S}_{S_i}^t$ are the maximal and minimal complex powers that imported from the transmission system into bus i at evaluating interval t. $x_{is}^t$ is a binary on/off status for the super-switch between bus i and the substation, 0 indicates off, and 1 indicates on.

The power generations of distributed generators are constrained by the availability rate of generations that determined by the weather conditions for renewable generations, the commitment status of generators according to system schedules, and the technical limits for the generators:

$$x_{G_j}^t AV_{j,m}^t \underline{S}_{G_{j,m}} \le S_{G_{j,m}}^t \le x_{G_j}^t AV_{j,m}^t \overline{S}_{G_{j,m}}, \quad (7)$$

where $\overline{S}_{G_{j,m}}$ and $\underline{S}_{G_{j,m}}$ are the maximal and minimal complex powers of generator j on phase m. $AV_{j,m}^t$ is the availability rate of generator j on phase m at evaluating interval t. $x_{G_i}^t$ is a binary on/off status for the commitment status of generator j, 0 indicates that the generator online, and 1 indicates that the generator is off. If a basic switching section b is determined to be de-energized, then all distribution generators within the section have to be shut off:

$$x_{G_j}^t \le x^b, j \in SGEN_i, i \in SBUS^b, b \in SBSS, t \in T, \quad (8)$$

In addition, minimum up and down time for generators should also be included in the model.

$S_{R_{j,m}}^t$ is the amount of power that customers participate in demand response program to be reduced with tolerable discomfort, and constrained by:

$$x^b \underline{S}_{R_{j,m}} \le S_{R_{j,m}}^t \le x^b \overline{S}_{R_{j,m}}, \quad (9)$$

where $\underline{S}_{R_{j,m}}$ and $\overline{S}_{R_{j,m}}$ are the minimal, and maximal tolerable power reductions of load j on phase m at evaluating interval t.

$S_{C_{j,m}}^t$ is the amount of power that the system has to cut off for system security, reliability or safety reasons. The power curtailments are constrained by:

$$S_{C_{j,m}}^t = (1 - x^b)(S_{D_{j,m}}^t - S_{R_{j,m}}^t), \quad (10)$$

This constraint requires the load completely cut off when its BSS is de-energized, and no load cut when the BSS is energized.

The charging and discharging rates for storages are constrained by their technical limits and commitment statuses as:

$$x_{DCH_j}^t \underline{R}_{DCH_{j,m}} \le R_{DCH_{j,m}}^t \le x_{DCH_j}^t \overline{R}_{DCH_{j,m}}$$

$$x_{CH_j}^t \underline{R}_{CH_{j,m}} \le R_{CH_{j,m}}^t \le x_{CH_j}^t \overline{R}_{CH_{j,m}}, \quad (11)$$

where $\overline{R}_{DCH_{j,m}}$ and $\underline{R}_{DCH_{j,m}}$ are the maximal and minimal discharging rates for storage j on phase m at evaluating interval t. $\overline{R}_{CH_{j,m}}$ and $\underline{R}_{CH_{j,m}}$ are the maximal and minimal charging rates for storage j on phase m evaluating interval t. $x_{DCH_j}^t$ and $x_{CH_j}^t$ are the binary commitment status for discharging and charging for storage j, 0 indicates off, and 1 indicates on. The commitment statues of a storage have to be set as off if its basic switching section is de-energized:

$$x_{DCH_j}^t \le x^b, \text{ and}$$

$$x_{CH_j}^t \le x^b,$$

$$j \in SSTOR_i, i \in SBUS^b, b \in SBSS, t \in T, \quad (12)$$

The ramp up and ramp down constraints for any self-sufficient section s are $$\Sigma_{b \in SBSS} x^{b,s} RU_m^{b,t} \ge 0, \text{ and}$$

$$\Sigma_{b \in SBSS} x^{b,s} RD_m^{b,t} \ge 0,$$

$$s \in SSSS, m \in SPH, t \in T, \quad (13)$$

where SSSS is the set of self-sufficient sections at current operation cycle. SPH is the set of phases. $x^{b,s}$ is a binary variable to indicate whether a basic switching section b is in the self-sufficient section s, and determined by the on/off statuses of super-switches and system topology connections. $RU_m^{b,t}$ and $RD_m^{b,t}$ are the ram up and ramp down reserves for basic switching section b on phase m at evaluating interval t, and determined according to:

$$RU_m^{b,t} = \sum_{i \in SBUS^b} \left[ \sum_{j \in SGEN_i} x_{G_j}^t R_{G_{j,m}}^{UP} + \sum_{j \in SSTOR_i} x^b \eta_{DCH_{j,m}} \overline{R}_{DCH_{j,m}}^t - \right. \quad (14)$$

$$\left. \sum_{j \in SLOAD_i} \left( x^b S_{D_{j,m}}^{t+1} - S_{R_{j,m}}^{t+1} - S_{C_{j,m}}^{t+1} - x^b S_{D_{j,m}}^t + S_{R_{j,m}}^t + S_{C_{j,m}}^t \right) \right],$$

and $$RD_m^{b,t} = \sum_{i \in SBUS^b} \left[ \sum_{j \in SGEN_i} x_{G_j}^t R_{G_{j,m}}^{DN} + \sum_{j \in SSTOR_i} x^b \frac{\overline{R}_{CH_{j,m}}^t}{\eta_{CH_{j,m}}} - \right.$$

$$\left. \sum_{j \in SLOAD_i} \left( x^b S_{D_{j,m}}^t - S_{R_{j,m}}^t - S_{C_{j,m}}^t - x^b S_{D_{j,m}}^{t+1} + S_{R_{j,m}}^{t+1} + S_{C_{j,m}}^{t+1} \right) \right],$$

wherein $R_{G_{j,m}}^{UP}$ and $R_{G_{j,m}}^{DN}$ are the ramp up, and ramp down limits for generator j on phase m at evaluating interval t.

For any storage in the system, there are constraints on minimal charging and discharging times:

$$t_{CH_{j,m}}^t \geq x^b \underline{t}_{CH_{j,m}}, \text{ and}$$

$$t_{DCH_{j,m}}^t \geq x^b \underline{t}_{DCH_{j,m}}, \text{ and}$$

$$b \in SBSS^b, i \in SBUS^b, \in SSTOR_i, m \in PH_i, t \in T, \quad (15)$$

where, $t_{CH_{j,m}}^t$ and $t_{DCH_{j,m}}^t$ are the number of current consecutive charging, and discharging intervals for storages j on phase m at evaluating interval t respectively. $\underline{t}_{CH_{j,m}}$ and $\underline{t}_{DCH_{j,m}}$ are the minimal consecutive charging, and discharging interval number for storages j on phase m.

The constraints of state of charge for the storages are $$SOC_{j,m}^t = SOC_{j,m}^{t-1} + R_{CH_{j,m}}^t \Delta t - R_{DCH_{j,m}}^t \Delta t, \text{ and}$$

$$\underline{SOC}_{j,m} \leq SOC_{j,m}^t \leq \overline{SOC}_{j,m}, \text{ and}$$

$$b \in SBSS, i \in SBUS^b, j \in SSTOR_i, m \in PH_i, t \in T, \quad (16)$$

where $SOC_{j,m}^t$ is the state of charge for storages j on phase m at evaluating interval t, and $\Delta t$ is the duration time of evaluating interval, $\underline{SOC}_{j,m}$ and $\overline{SOC}_{j,m}$ are the maximal and minimal state of charge limits for storages j on phase m.

For each self-sufficient section, there are also minimal stability margin constraints. The stability margins can be determined using various methods. For example, using the stability margin analysis method according to the embodiments, the required stability margin can be $$SCPM^{s,t} \geq 0,$$

$$SCEM^{s,t} \geq 0, \text{ and}$$

$$s \in SSSS, t \in T, \quad (17)$$

where $SCPM^{s,t}$ and $SCEM^{s,t}$ are the storage compensation power margin, and the storage compensation energy margin for self-sufficient section s at evaluating interval t.

In addition, necessary constrains including the topology-based relationship between the on/off statuses of super-switches and the definition of self-sufficient sections should also be included in the model.

Objective Functions

An optimal configuration candidate is determined according to multiple objective functions.

(I). Objective for Energy Efficiency

A minimization of average line loss for the system over entire operation cycle is used to represent the objective for energy efficiency:

$$Index_{loss} = \frac{1}{\tau} \sum_{t \in T} \sum_{b \in SBSS} \sum_{ij \in SDEV^b} \sum_{m \in PH_{ij}} |P_{ij,m}^t + P_{ji,m}^t|, \quad (18)$$

where, $\tau$ is the total number of evaluating intervals. $P_{ij,m}^t$ and $P_{ji,m}^t$ are active power flows on the device between bus i and bus j on phase m at two different directions. The absolute value of the summation of those two flows is the line loss for the device. The goal for the optimization is to find an optimal combination of self-sufficient sections to minimize the average line loss for all evaluating intervals of the operation cycle.

(II). Objective for Power Quality

The quality of power provided to the customer is commonly measured by the voltage served at the customers. This objective is represented as a minimization of average weighted sum of voltage deviations from desired levels and voltage violations against voltage thresholds:

$$Index_{voltage} = \quad (19)$$

$$\frac{1}{\tau} \sum_{t \in T} \sum_{b \in SBSS} \sum_{i \in SBUS^b} \sum_{m \in PH_i} \left[ |V_{i,m}^t - \tilde{V}_{i,m}| + \beta_{vol}(\Delta \overline{V}_{i,m}^t + \Delta \underline{V}_{i,m}^t) \right],$$

where $\tilde{V}_{i,m}$ is the desired reference voltage level of bus i on phase m, for example, 1.0 per unit. $\beta_{vol}$ is the penalty factor for voltage violations, for example, 100.0. The voltage performance index evaluates the voltage deviations, and voltage violations for all buses in each BSS. The goal of the optimization is to select optimal set of statues for super-switches to minimize the average weighted sum of voltage deviations and violations over the operation cycle.

(III) Objective for Device Loading and Security

The objective is represented as minimization of weighted sum of deviations from economical loading levels and overloads against the device capacities:

$$Index_{loading} = \quad (20)$$

$$\frac{1}{\tau} \sum_{t \in T} \sum_{b \in SBSS} \sum_{ij \in SDEV^b} \sum_{m \in PH_{ij}} \left( \frac{||S_{ij,m}^t| - \tilde{S}_{ij,m}| + \beta_{overload} \Delta \overline{S}_{ij,m}^t}{\overline{S}_{ij-m}} \right),$$

where $\tilde{S}_{ij,m}$ is a desired economical loading power determined for its well-functioning over the entire life cycle of the device. $\beta_{overload}$ is the penalty factor for overloads. This performance index evaluates the average loading deviation and overloading level over the operation cycle. The goal of the optimization is pushing the device to be loaded to its economical level as closer as possible, but within its normal security limits.

(IV) Objective for Customer Comfort and Reliability

This objective is represented as minimization of average weighted sum of customer approved power reduction and forced power curtailment as:

$$Index_{loadcut} = \quad (21)$$

$$\frac{1}{\tau} \sum_{t \in T} \sum_{b \in SBSS} \sum_{i \in SBUS^b} \sum_{j \in SLOAD_i} \sum_{m \in PH_i} (\beta_{reduction}^t P_{R_{j,m}}^t + \beta_{shedding}^t P_{C_{j,m}}^t),$$

where $\beta_{reduction}^t$ and $\beta_{shedding}^t$ are the penalty coefficients to represent the customer discomfort caused by power reduction, and loss caused by forced power shedding. $\beta_{shedding}^t$ is set to a much higher value than $\beta_{reduction}^t$, for example, 10 times higher. $P_{R_{j,m}}^t$ and $R_{C_{j,m}}^t$ are the customer-approved active power reduction and forced active power shedding at load j phase m. The goal of this optimization is maximally satisfying the power demands for customers. For some occasions, if load reduction or shedding is inevitable, the optimization is to minimize the impacts of power reduction and cut to the customers.

This function is used in step 635 of FIG. 6B as the objective function to determine the commitment statues and quantities of distributed generations, storages and demand responsive resources either over a single evaluating interval, or multiple evaluating levels with all non-stability constraints and a fixed configuration.

(V) Objective for Energy Independency and Renewable Utilization

To enhance the energy independency, the system should make maximal use of distributed generations provided by the renewable energy resources, and maximally reduce the power purchases from the transmission systems and during higher price periods. This objective is represented as minimization of a weighted sum of the unutilized active powers of distributed generations, and active power purchasing from the main grid averaged for the all evaluating intervals:

$$Index_{renewable} = \tag{22}$$
$$\frac{1}{\tau} \sum_{t \in T} \sum_{b \in SBSS} \sum_{i \in SBUS^b} \sum_{m \in PH_i} \left[ \sum_{j \in SGEN_i} (x_{G_j}^t A V_{j,m}^t \overline{P}_{G_{j,m}} - P_{G_{j,m}}^t) + \beta_{purchase,i}^t P_{S_{i,m}}^t \right],$$

where $P_{G_{j,m}}^t$ is the active power generated by distributed generators j on phase m at evaluating interval t. $\overline{P}_{G_{j,m}}$ is the active-power capacity of distributed generators j on phase m. $P_{S_{i,m}}^t$ is the active power imported from the transmission system through substation at bus i on phase m at evaluating interval t. $\beta_{purchase,i}^t$ is a penalty coefficient representing the electricity tariff charged for importing power from the main grid on substation at bus i at interval t. The electricity tariff may be varied with time and location. Most of the time, the distribution system attempts to satisfy its loads by itself. But when there is generation shortage during a certain period, the distribution system can import power from the main grid. Similarly, when there is excessive power in a part of the distribution system, the excessive power can be exported to the main grid.

(VI) Objective for Switch Operations

The goal of the optimization is to limit the unnecessary switching, and the unnecessary combining of BSSs. If the power flow on an energized switch is relatively low, it may indicate there is no need to combine two adjacent BSSs. The objective is represented as minimization of a weighted sum of the total number of switch open/close state change, and the averaged total number of supper switches with loading less than given thresholds for all evaluating intervals:

$$Index_{switching} = \tag{23}$$
$$\sum_{ij \in SSW} |x_{ij} - x_{ij}^{(0)}| + \frac{\beta_{light-loading}}{\tau} \sum_{t \in T} \sum_{ij \in SSW} \frac{\sum_{m \in PH_{ij}, |S_{ij,m}^t| \leq x_{ij} S_{ij,m}} 1.0}{\sum_{m \in PH_{ij}} 1.0},$$

where, $x_{ij}^{(0)}$ is the initial open/close status for the switch between bus i and bus j before current operation cycle. $\beta_{light-loading}$ is the weighting factor for light-loading switches. $\underline{S}_{ij,m}$ is the lower apparent power threshold for a switch between bus i and bus j on phase m for determining the light-loading status for a switch, for example, it can be set as 5% of normal loading capacity.

(VII) Objective for System Stability

The goal of the optimization is to enable each self-sufficient section having a predetermined stability margin to withstand unanticipated events, such as significant load drop or increase. This objective is represented as maximization of a weighted sum of the storage compensation power margin, and the storage compensation energy margin for each self-sufficient section at each evaluating interval:

$$Index_{stability} = \tag{24}$$
$$\min_{t \in T} [\min_{s \in SSSS} (\beta_{power-margin} * SCPM^{s,t} + \beta_{energy-margin} * SCEM^{s,t})],$$

where $\beta_{power-margin}$ and $\beta_{energy-margin}$ are the weighting factors for power based stability margin, $SCPM^{s,t}$ and energy-based stability margin, $SCEM^{s,t}$ for self-sufficient section s at evaluating interval t, respectively.

The optimization problem formulated above is a multi-objective optimization, so there is no single global optimal solution for all objective functions. With super-switches on/off status and nonlinear AC power flow constraints, it is a mixed nonlinear integer programming problem, which can be solved by a heuristic algorithm, decomposition algorithm (such as Benders decomposition), genetics algorithm, particle swarm optimization, or an artificial immune system algorithm.

In order to avoid the unnecessary solving of optimal configuration change described above, the performances indices for current configuration are first checked against a set of predetermined thresholds according to:

$$Index_{loss} > \overline{R}_{loss}, \tag{25}$$

$$Index_{voltage} > \overline{R}_{voltage}, \tag{26}$$

$$Index_{loading} > \overline{R}_{loading}, \tag{27}$$

$$Index_{loadcut} > \overline{R}_{loadcut}, \tag{28}$$

$$Index_{renewable} > \overline{R}_{renewable}, \tag{29}$$

$$Index_{switching} > \overline{R}_{switching}, \tag{30}$$

$$Index_{stability} < \underline{R}_{stability}, \tag{31}$$

wherein $\overline{R}_{loss}$, $\overline{R}_{voltage}$, $\overline{R}_{loading}$, $\overline{R}_{loadcut}$, $\overline{R}_{renewable}$, and $\overline{R}_{switching}$ are the maximal tolerated values for line loss, voltage violations, device overloads, load cut, unutilized renewable powers, and switching action without a need for configuration change. $\underline{R}_{stability}$ is a minimal stability margin for keeping current configuration without a change.

If and only if any of above conditions is met, a new solution for the above described multi-objective optimization problem is triggered.

Optimal New Configuration

To solve this problem more effectively, the problem is first solved without stability constraints (17) and objective function (24). After candidate solutions are obtained, then a stability analysis is performed for the candidates to determine whether the candidates have minimal stability margins.

The final solution should be a candidate that is within the candidate list determined by multiple objective optimization with all non-stability constraints and objectives, and has a minimal stability margin evaluated by a stability analysis.

FIG. 7 is the flowchart for determining the optimal new configuration 660.

In step 710, generate a set of candidates for the configurations using multiple objective functions without stability constraints and objectives.

In step 720, select an optimal candidate that has a best performance.

In step 730, perform stability analysis of the optimal candidate.

In step 740, check whether the optimal candidate has a minimal stability margin, for example, using the indices described above. If yes, go to step 760 to output the solution and configure the distribution system accordingly. Otherwise if no, go to step 750 to delete the selected candidate from the candidate list, and go to step 720 for next iteration.

Transient Stability Evaluation Indices

Most critical for a successful configuration change is the computational time, especially in response to an emergency, such as a total collapse of the transmission system 110. The computational time for configuring the distribution system must be within a maximal tolerable response time determined by load, generator and switch characteristics. The computational time is also important in order to achieve real-time measuring and almost continuous monitoring, which are not attainable by convention methods.

The main computational burden is the stability margin evaluation. Because the stability is dependent on the storage participation in the distribution systems, one embodiment can use a method based on the storage compensation ability to analyze the transient stability of the distribution system. The method determines the optimal configuration, e.g., for an evaluating interval of a couple of minutes. All the transient unstable candidates are discarded, and only the transient stable candidates are further analyzed. To serve this purpose, the method determines the transient stability margin using a single snapshot of the system state.

The method focuses on the storage compensation margin (SCM), and is motivated by a swing equation and a kinetic energy concept. It is assumed that there is a large storage device that can distribute power instantaneously to any bus in the distribution system. This distributed power is used to compensate for any real-time power mismatches. With such compensation, the original kinetic energy absorbed or provided by the synchronous generators is be absorbed or provided by the storage instead. With the help of the storage, the system remains at the original equilibrium point. For a self-sufficient section connected with main grid, the capacities of main grid are modeled as storages and included in the calculations as well.

Then, one can analyze the system condition to calculate this mismatch power for a given event such as sudden load drop or contingency. For a predetermined time constant, ideal storage power and energy ratings can be determines. The current system condition is compared with the ratings to check for the transient stability margin.

This approach does not require any time domain simulation or data mining, so processing time is minimized. In addition, because the system has more inertia that is not calculated during the SCM, it actually requires less storage compensation during the transient process. Therefore, the SCM is a more conservative result, and provides the system with a margin upper bound. Therefore, the system can be even more transient stable than calculated.

Swing Equation

A swing equation for a generator i can be expressed as $$M_{G_i}\frac{d^2\delta_{G_i}}{dt^2} = P_{M_i} - D_i\frac{d\delta_{G_i}}{dt} - \sum_{m\in PH_i} P_{G_{i,m}}, \tag{32}$$

where, $M_{G_i}$ is the angular momentum of generator i. $\delta_{G_i}$ is the rotor angle of generator i, $P_{M_i}$ is the input mechanical power of generator i, $D_i$ is damping coefficient for generator i. $P_{G_{i,m}}$ is the active power generated by the generator i on phase m.

In the normal operation hours, the mechanical torque and electric torque are balanced at the most of the time. Small deviations cause small angle oscillations, and damped out quickly. For severe disturbances, without storage or main grid participation, the accelerating power that drives the rotor angles deviate from its original equilibrium points. This can cause instability.

The swing equation for generator i with virtual contributions of storages and sudden load changes is $$M_{G_i}\frac{d^2\delta_{G_i}}{dt^2} = \tag{33}$$
$$P_{M_i} - D_i\frac{d\delta_{G_i}}{dt} - \sum_{m\in PH_i} P_{G_{i,m}} + \sum_{m\in PH_i} \Delta P_{D_{i,m}} - \sum_{m\in PH_i} P_{V_{i,m}},$$

where $\Delta P_{D_{i,m}}$ is the virtual sustainable load variation level at generator i on phase m, $P_{V_{i,m}}$ is the additional virtual storage participation power at generator i. The sudden load variation $\Delta P_{D_{i,m}}$ is an important feature of the method. If the number too large, then the system is too conservative, and if too small, then the system is unreliable. A sustainable net load variation level can be set as within a predetermined percentage of the current load, for example ±10%. With such assumptions, the system can withstand a certain level of load variation without transient reliability issues. The additional virtual storage participation power provides the mitigation for the unexpected large power disturbances. Noted that the $\Delta P_{D_{i,m}}$ and $P_{V_{i,m}}$ can have positive or negative values.

If the virtual contributions of storages and load variations are canceled each other, the generator can maintain its rotor angle and speed almost constant after the sustainable load variation. Similarly, for a self-sufficient section, if the total required virtual storages are within the capacities of existing storages and main grid, then the section is stable. The surplus of storage capacities over the required amount of virtual storages are the stability margins.

The required storage power rating $P_V^{s,t}$ for the self-sufficient section s at interval t is $$P_V^{s,t} = \Sigma_{i\in STOR^s}\Sigma_{m\in PH_i} P_{V_{i,m}}{}^t. \tag{34}$$

$STOR^s$ is the set of storages in the self-sufficient section s. The needed storage power participation is the sum of the all the virtual storage in the section. $P_{V_{i,m}}{}^t$ can be determined based on the allocations of sustainable load variations in the section.

The real-time storage compensation capability in the section can be partitioned into charging and discharging components. The system storage compensation capabilities are $$P_{CH}{}^{s,t} = \Sigma_{i\in STOR_s}\Sigma_{m\in PH_i} R_{CH_{i,m}}{}^t, \text{ and} \tag{35}$$

$$P_{DCH}{}^{s,t} = \Sigma_{i\in STOR_s}\Sigma_{m\in PH_i} R_{DCH_{i,m}}{}^t, \tag{36}$$

wherein $P_{CH}^{s,t}$ and $P_{DCH}^{s,t}$ are the charging and discharging power capacities for the section s at evaluating interval t. Similarly, the required storage power rating $P_V^{s,t}$ can also be decomposed into charging and discharging components, $P_{V,CH}^{s,t}$ and $P_{V,DCH}^{s,t}$ based on that the event is a load rise, or a load drop.

When the self-sufficient section is subject to a power shortage and lack of kinetic energy, the discharging power $P_{DCH}^{s,t}$ is used. When the section has excessive power and additional kinetic energy, the charging power $P_{CH}^{s,t}$ is used to absorb the additional kinetic energy.

The storage compensation power margin, SCPM for section s at interval t, $SCPM^{s,t}$ is defined as $$SCPM^{s,t} = \begin{cases} \min\{0, P_{CH}^{s,t} - P_{V,CH}^{s,t}\}, \text{ during charging, and} \\ \min\{0, P_{DCH}^{s,t} - P_{V,DCH}^{s,t}\}, \text{ during discharging} \end{cases} \quad (37)$$

The SCPM is calculated by comparing charging or discharging ability with virtual storage power ratings.

The invention uses a storage critical time parameter, $\tau_{sct}$ as a measurement for the self-sufficient section to maintain stability for a reasonable period of time with disturbance. The $\tau_{sct}$ can consider the relaying time, primary control action delay, control entering time, and disturbance clearing time. The purpose of this parameter is that the system should be able to sustain a large load variation without causing transient stability issues for $\tau_{sct}$ seconds. With this parameter, one can define energy related parameters for the storage.

The storage compensation energy margin, SCEM for section s at evaluating interval t, $SCEM^{s,t}$ is defined as $$SCPM^{s,t} = \begin{cases} \min\{0, E_{CH}^{s,t} - P_{V,CH}^{s,t}\tau_{sct}\}, \text{ during charging, and} \\ \min\{0, E_{DCH}^{s,t} - P_{V,DCH}^{s,t}\tau_{sct}\}, \text{ during discharging} \end{cases} \quad (38)$$

wherein $E_{CH}^{s,t}$ and $E_{DCH}^{s,t}$ are the charging and discharging energy capacities for the section s at evaluating interval t.

For the storage system, the energy information is important. It is determined by storage critical time $\tau_{sct}$ and virtual storage power that determined in the SCPM calculation.

It is noted that the SCPM and SCEM provide a sufficient condition for holding the transient stability. Because the synchronous generators and converter-based generators provide actual or virtual inertia to the distribution system, with additional virtual inertia from the storage, the calculated system margin provides a reliable solution to the problem due to the conservativeness in the model. The system can even suffer from a larger disturbance without losing synchronism.

For a distribution system that is only equipped with converter connected generators, e.g., solar panels, the system does not have any actual inertia, and is sensitive to power fluctuations, so rotor angles and frequency can have variations for the disturbances. With storage, the system can be smoothed during the real-time operation. In addition, a wind shaft and solar panel can provide additional virtual inertia to the system during the transient process.

For a distribution system with synchronous generators, the system has actual inertia, but it is still hard to analyze whether the inertia is sufficient to handle large disturbances without detailed time-domain simulations. Even though the system transient stability is enhanced with the storage, the degree of enhancement is still non-trivial to obtain directly. The SCPM and SCEM provide a margin upper bound for the distribution system to remain transient stability during large disturbance, numerical values to the examine stability margin efficiently.

Effect of the Invention

Conventional power distribution systems are fed from a transmission system or main grid, use a radial configuration, and operate with unidirectional flows. The configurations of conventional distribution systems is fixed, and with a "one-size-fits-all" reliability standards. Thus, conventional systems can be prone to wide-spread outages and slow restoration. They also have low efficiency, reliability and quality.

The increasing use of renewable generation, and utility-scale storage require that distribution systems be configured and operated in a manner that is different from the past, requiring more flexibility to facilitate more renewables, higher standards of reliability and quality, and higher energy efficiency.

The distribution system according to embodiments of the invention can be dynamically and adaptively configured in real-time to respond to changes in load, source, and system conditions to increase energy efficiency, system reliability, and power quality of distribution systems.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for configuring a power distribution system including super switches, comprising steps of:
   measuring and collecting, in real-time, state information of the distribution system;
   evaluating periodically, using an evaluating interval and an objective function, the state information; and
   generating, in response to a system configuration signal generated after the evaluating a set of candidates for configurations of the power distribution system using the objective function and constraints;
   selecting an optimal candidate from the candidates for the configurations;
   performing stability analysis of the optimal candidate; and,
   changing the configuration of the power distribution system to the optimal candidate using the super switches when the optimal candidate has a minimal stability margin, using an operation cycle, wherein the operation cycle is longer than the evaluating interval.

2. The method of claim 1, wherein the super switches are solid state switches.

3. The method of claim 2, wherein the solid state switches are controlled by phasor measurement units.

4. The method of claim 1, further comprising:
   partitioning the power distribution system into self-sufficient sections by combining adjacent basic switching sections, wherein each of the basic switching sections is a minimal section that the distribution system serves or isolates, and wherein each of the self-sufficient sections operates independently and has sufficient generation and storage reserve to maintain a stable frequency and voltage.

5. The method of claim 4, further comprising:
determining a feasible self-sufficient section without violations of a set of constraints, including minimal and maximal voltage constraints, power flow limits on two directions, load and generation balance requirements with storage charging and discharging, ramp up and ramp down constraints for generators, minimal charging and discharging times for storages, state of charge for the storages, minimal stability margin constraints.

6. The method of claim 4, further comprising:
determining an optimal combination of the self-sufficient sections with multiple objective functions, including minimize line losses, minimize voltage deviations and violations, minimize loading deviations and overloads, minimization voluntary load reduction and forced load curtailment, minimization unutilized renewable energy and main grid power purchase, minimization number of switch operations and switch closing with light loading, and maximization of transient stability margins.

7. The method of claim 1, wherein the minimal stability margin includes a storage compensation margin (SCM) to compensate for real-time power disturbances.

8. The method of claim 7, wherein transient security indices include a storage compensation power margin (SCPM) and a storage compensation energy margin (SCEM).

9. The method of claim 8, wherein the SCPM for a self-sufficient section is determined as the difference between charging and discharging power capacities of energized storages of the section, and required virtual charging and discharging power ratings resulting from unanticipated disturbances within the self-sufficient section.

10. The method of claim 8, wherein the SCEM for a self-sufficient section is determined as a difference between charging and discharging energy capacities of energized storages of the section, and required virtual charging and discharging energy ratings resulting from unanticipated disturbances within the self-sufficient section.

11. A power distribution system, comprising:
super switches to change configurations of the distribution system;
a substation connected to the super switches for operating the switches, wherein the substation is connected to a main grid of a power transmission system for supplying a power to the distribution system from the power transmission system, wherein the substation performs computational operations comprise steps of:
measuring and collecting, in real-time, state information of the distribution system using the super switches;
evaluating periodically, using an evaluating interval and an objective function, the state information; and
generating, in response to a system configuration signal generated after the evaluating, a set of candidates for configurations of the power distribution system using the objective function and constraints;
selecting an optimal candidate from the candidates for the configurations;
performing stability analysis of the optimal candidate; and,
changing the configuration of the power distribution system to the optimal candidate using the super switches when the optimal candidate has a minimal stability margin using an operation cycle, wherein the operation cycle is longer than the evaluating interval.

12. The power distribution system of claim 11, wherein the super switches are controlled by phasor measurement units.

13. The power distribution system of claim 11, the steps further comprising:
partitioning the power distribution system into self-sufficient sections by combining adjacent basic switching sections, wherein each of the basic switching sections is a minimal section that the distribution system serves or isolates, and wherein each of the self-sufficient sections operates independently and has sufficient generation and storage reserve to maintain a stable frequency and voltage.

14. The power distribution system of claim 13, the steps further comprising:
determining a feasible self-sufficient section without violations of a set of constraints, including minimal and maximal voltage constraints, power flow limits on two directions, load and generation balance requirements with storage charging and discharging, ramp up and ramp down constraints for generators, minimal charging and discharging times for storages, state of charge for the storages, minimal stability margin constraints.

15. The power distribution system of claim 13, the steps further comprising:
determining an optimal combination of the self-sufficient sections with multiple objective functions, including minimize line losses, minimize voltage deviations and violations, minimize loading deviations and overloads, minimization voluntary load reduction and forced load curtailment, minimization unutilized renewable energy and main grid power purchase, minimization number of switch operations and switch closing with light loading, and maximization of transient stability margins.

16. The power distribution system of claim 11, wherein the minimal stability margin includes a storage compensation margin (SCM) to compensate for real-time power disturbances.

17. The power distribution system of claim 16, wherein transient security indices include a storage compensation power margin (SCPM) and a storage compensation energy margin (SCEM).

18. The power distribution system of claim 17, wherein the SCPM for a self-sufficient section is determined as the difference between charging and discharging power capacities of energized storages of the section, and required virtual charging and discharging power ratings resulting from unanticipated disturbances within the self-sufficient section.

19. The power distribution system of claim 17, wherein the SCEM for a self-sufficient section is determined as a difference between charging and discharging energy capacities of energized storages of the section, and required virtual charging and discharging energy ratings resulting from unanticipated disturbances within the self-sufficient section.

20. The power distribution system of claim 11, wherein the super switches are solid state switches.

* * * * *